US005797656A

United States Patent [19]
Kauk et al.

[11] Patent Number: 5,797,656
[45] Date of Patent: Aug. 25, 1998

[54] APPARATUS FOR DIVERTING A FLOW OF EXHAUST FROM AN ENGINE OF A TRUCK

[75] Inventors: Zachary A. Kauk; Richard D. Walker, both of Decatur, Ill.

[73] Assignee: Caterpillar Inc., Peoria, Ill.

[21] Appl. No.: 641,981

[22] Filed: May 2, 1996

[51] Int. Cl.⁶ .................................................. B60P 1/60
[52] U.S. Cl. ......................................... 298/1 H; 137/885
[58] Field of Search .......................... 298/1 H; 137/885, 137/872, 875; 237/92.3 R, 12.3 A

[56] References Cited

U.S. PATENT DOCUMENTS

| | | | |
|---|---|---|---|
| 3,472,548 | 10/1969 | Comisac | 298/1 H |
| 3,695,708 | 10/1972 | Vincenty | 298/1 H |
| 3,731,973 | 5/1973 | Kermode | 298/1 H |
| 3,994,530 | 11/1976 | Zaborsky et al. | 298/1 H |
| 4,002,370 | 1/1977 | Blackmore | 298/1 H |
| 4,143,677 | 3/1979 | Schell | 298/1 H |
| 4,342,333 | 8/1982 | Mizund et al. | 298/1 H |
| 4,893,656 | 1/1990 | Willhoft | 137/885 |
| 4,909,279 | 3/1990 | Nakamura et al. | 137/885 |
| 4,978,068 | 12/1990 | Eldrige | 298/1 H |
| 5,379,801 | 1/1995 | Reinhart et al. | 298/1 H |

*Primary Examiner*—Karen B. Merritt
*Assistant Examiner*—Douglas Hess
*Attorney, Agent, or Firm*—Dennis C. Skarvan; William B. Heming

[57] ABSTRACT

An apparatus is disclosed for diverting a flow of exhaust from an engine of a truck having a truck bed and a muffler system, with the truck bed having a duct system. The apparatus includes an inlet for receiving the flow of exhaust from the engine. The apparatus further includes a first outlet connected to the muffler system and a second outlet connected to the duct system. The apparatus additionally includes a diverter member positionable between a first position and a second position, wherein (1) fluid communication between the inlet and the first outlet is prevented when the diverter member is positioned in the first position, and (2) fluid communication between the inlet and the second outlet is prevented when the diverter member is positioned in the second position. Moreover, the apparatus includes an air cylinder for moving the diverter member between the first position and the second position. The apparatus also includes a sensor which detects decoupling of the second outlet from the duct system and generates an electrical signal in response thereto, wherein the air cylinder moves the diverter member between the first position and the second position in response to generation of the electrical signal. A method of directing exhaust from an engine of a truck is also disclosed.

16 Claims, 6 Drawing Sheets

Fig_4_

Fig. 6

| First Sensor Mechanism 66 Status | Second Sensor Mechanism 68 Status | Signal Line 64 Status | Air Solenoid 40 Status |
|---|---|---|---|
| Off | Off | No signal | Unpowered - Air prevented from flowing through solenoid |
| On | Off | Signal | Powered - Air allowed to flow through solenoid |
| Off | On | Signal | Powered - Air allowed to flow through solenoid |
| On | On | Signal | Powered - Air allowed to flow through solenoid |

APPARATUS FOR DIVERTING A FLOW OF EXHAUST FROM AN ENGINE OF A TRUCK

BACKGROUND OF THE INVENTION

The present invention relates generally to an apparatus and method for diverting exhaust from an engine of a truck, and more particularly to a method and apparatus for selectively diverting a flow of exhaust to either a bed duct system of the truck or a muffler system of the truck.

A dump truck includes a bed for receiving material therein. Typically, the bed can be raised by a hydraulic system so as eject the material from the bed at an appropriate time. Thereafter, the bed can be lowered so that additional material may be loaded therein.

During certain weather conditions, the material in the bed has a tendency to adhere to the walls of the bed (e.g. during cold weather conditions) thereby resisting ejection of the material from the bed. To overcome this problem, it is known to provide a duct system within the walls of the bed for receiving a flow of exhaust generated by the truck engine so that the flow of exhaust may be advanced therethrough thereby heating the walls of the bed. By providing heat to the walls of the bed in the above manner, the tendency of the material to adhere to the walls of the bed is reduced.

Some dump truck designs which include a duct system within the walls of the bed have a bed duct input port that is interfaced with and exhaust system output port when the bed is located in a lowered position so that the flow of exhaust can be advanced from the exhaust system into the bed duct system. material from the bed, the bed duct input port is decoupled from the exhaust system output port. This decoupling causes the flow of exhaust to exit out of the exhaust system output port directly into the atmosphere thereby resulting in a high level of undesirable noise being created. Note that if the flow of exhaust is routed through a muffler system or a bed duct system, such high level of undesirable noise is avoided.

In an attempt to overcome this problem, it is known to provide a diverter mechanism which prevents the flow of exhaust from exiting out of the exhaust system output port when the bed is being raised, or more particularly, when the bed duct input port is being decoupled from the exhaust system output port. Instead, at this time, the flow of exhaust is diverted to a muffler system so as to avoid the production of a high level of undesirable noise.

One design of a diverter mechanism which diverts the flow of exhaust from the bed duct system to the muffler system utilizes the bed itself to contact a lever member during lowering of the bed. In particular, a portion of the bed is lowered onto the lever member so as to move the lever member. In turn, the lever member moves a flap, via a mechanical linkage, from a first position to a second position. In the first position, the flap prevents the flow of exhaust from advancing into the muffler system while enabling the flow of exhaust to enter the bed duct system. In the second position, the flap prevents the flow of exhaust from advancing into the bed duct system and enables the flow of exhaust to enter the muffler system.

However, certain disadvantages exist with the above design. Firstly, the force applied by the bed onto the lever member is substantial and consequently causes the mechanical parts of the diverting mechanism to wear out relatively quickly. Secondly, the bed must be raised slightly in order for the diverter mechanism to move the flap from the first position to the second position. In the meantime, the bed duct input port separates from the exhaust system output port a slight distance before the flap is repositioned thereby causing a momentary occurrence of a high level of undesirable noise.

SUMMARY OF THE INVENTION

In accordance with one embodiment of the present invention, there is provided an apparatus for diverting a flow of exhaust from an engine of a truck having a truck bed and a muffler system, with the truck bed having a duct system. The apparatus includes a diverter member positionable between a first position and a second position, wherein (1) the flow of exhaust is prevented from being advanced into the muffler system and allowed to be advanced into the duct system when the diverter member is positioned in the first position, and (2) the flow of exhaust is prevented from being advanced into the duct system and allowed to be advanced into the muffler system when the diverter member is positioned in the second position. The apparatus further includes a sensor which detects raising of the truck bed, and generates a sensor signal in response thereto. In addition, the apparatus includes an actuator for moving the diverter member between the first position and the second position in response to generation of the sensor signal.

Pursuant to another embodiment of the present invention, there is provided an apparatus for diverting a flow of exhaust from an engine of a truck having a truck bed and a muffler system, with the truck bed having a duct system. The apparatus includes an inlet for receiving the flow of exhaust from the engine. The apparatus further includes a first outlet connected to the muffler system and a second outlet connected to the duct system. In addition, the apparatus includes a diverter member positionable between a first position and a second position, wherein (1) fluid communication between the inlet and the first outlet is prevented when the diverter member is positioned in the first position, and (2) fluid communication between the inlet and the second outlet is prevented when the diverter member is positioned in the second position. Moreover, the apparatus includes an air cylinder for moving the diverter member between the first position and the second position.

According to yet another embodiment of the present invention, there is provided a method of directing a flow of exhaust from an engine of a truck having a truck bed and a muffler system, with the truck bed having a duct system. The method includes the steps of (1) preventing the flow of exhaust from being directed to the muffler system and directing the flow of exhaust to the duct system when the truck bed is positioned in a lowered position, (2) detecting when an operator is raising the truck bed and generating an electrical signal in response thereto, and (3) preventing the flow of exhaust from being directed to the duct system and directing the flow of exhaust to the muffler system in response to generation of the electrical signal.

It is therefore an object of the present invention to provide a new and useful apparatus and method for diverting exhaust from an engine of a truck.

It is another object of the present invention to provide an improved apparatus and method for diverting exhaust from an engine of a truck.

It is yet another object of the present invention to provide an apparatus and method for diverting exhaust from an engine of a truck in which its working parts do not wear out relatively quickly.

It is a further object of the present invention to provide an apparatus and method for diverting exhaust from an engine of a truck in which a momentary occurrence of a high level of undesirable noise is not created when the truck bed is being raised from a lowered position to a raised position.

It is a further object of the present invention to provide an apparatus and method for diverting exhaust from an engine of a truck which is relatively quiet during raising of the truck bed.

The above and other objects, features, and advantages of the present invention will become apparent from the following description and the attached drawings.

BRIEF DESCRIPTION OF THE DRAWINGS

FIG. 6 is a chart showing the relationship of the states of the first sensor mechanism and the second sensor mechanism of the sensor of FIG. 5 in relation to the states of the signal line and the air solenoid.

DETAILED DESCRIPTION OF THE PREFERRED EMBODIMENT

Figure 1:
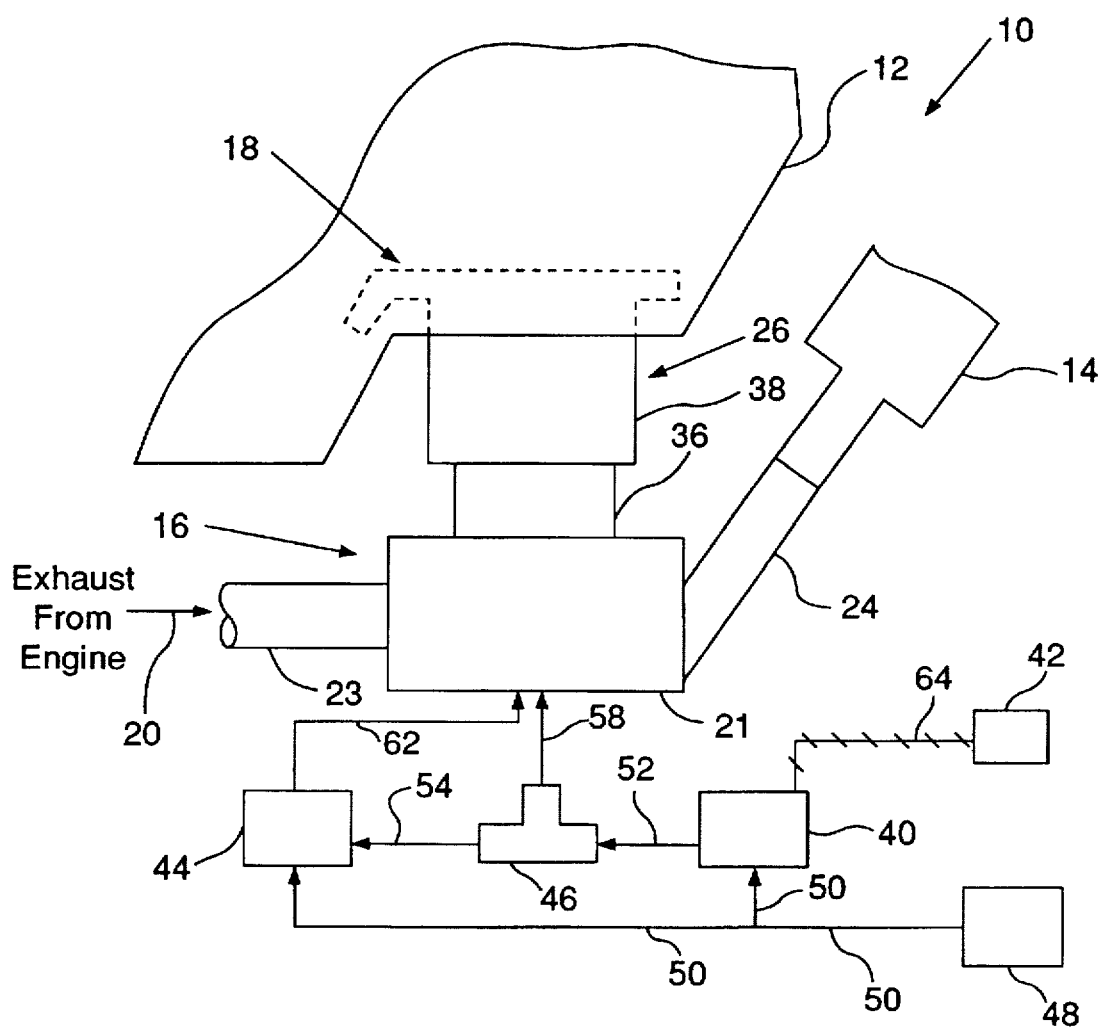
FIG. 1 is a schematic view of an apparatus for diverting exhaust from an engine of a truck which incorporates the features of the present invention therein, with the bed of the truck shown positioned in a lowered position.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
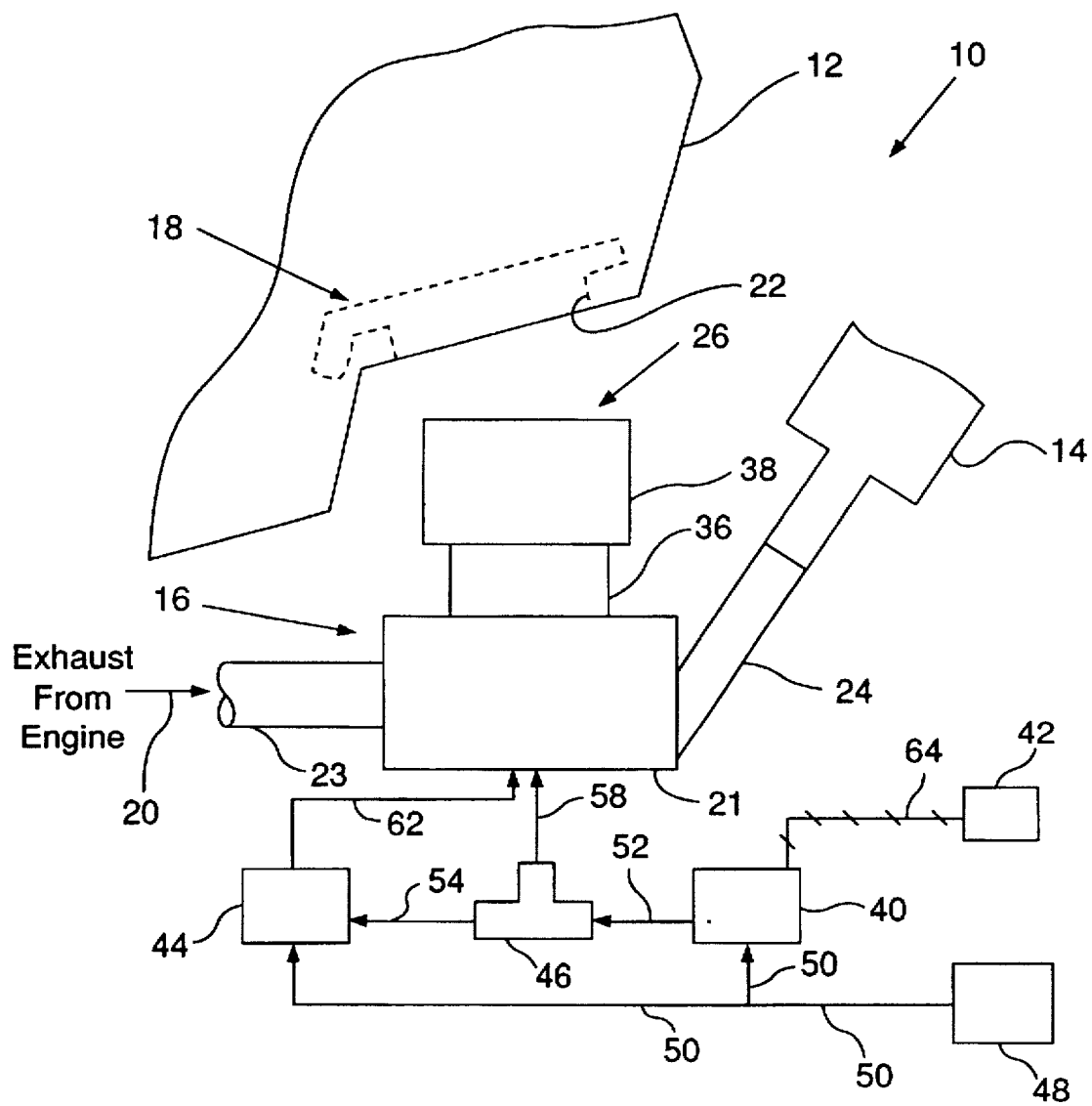
FIG. 2 is a view similar to FIG. 1, but showing the bed of the truck positioned in a raised position.

Referring now to FIGS. 1 and 2, there is shown a dump truck 10 (only a part of the dump truck is shown for clarity of description). The truck 10 includes a truck bed 12, a muffler system 14, an engine (not shown) and an apparatus 16 for diverting exhaust from the engine.

The bed 12 is configured to receive material (e.g. sand, asphalt, miscellaneous debris, etc.) and contain such material during travel of the truck 10 from one location to another location. At certain times, it will become desirable to eject or unload the material from the bed 12. In order to achieve the above, the bed 12 can be raised by a hydraulic system (not shown) from a lowered position as shown in FIG. 1 to a raised position as shown in FIG. 2. After the material has been ejected from the bed 12, the bed is returned to its lowered position. It should be noted that the bed 12 may be raised to one of a number of raised positions depending on the desire of the operator and the specific task to be performed in order to eject the material from the bed. However, only one raised position is shown herein.

During certain weather conditions, the material in the bed has a tendency to adhere to the walls of the bed (e.g. during cold weather conditions) thereby resisting ejection of the material from the bed 12. To reduce this adhering tendency, the bed 12 is provided with a bed duct system 18. When the bed 12 is positioned in its lowered position, the duct system 18 receives a flow of exhaust 20 from the engine. As the flow of exhaust 20 is advanced through the duct system 18, the walls of the bed 12 are heated thereby reducing the tendency of the material to adhere thereto.

The duct system 18 includes an input port 22 (see FIG. 2) while the exhaust transferring apparatus 16 includes a housing 21 having an inlet 23, a first outlet 24 and a second outlet 26. When the bed 12 is positioned in its lowered position as shown in FIG. 1, the input port 22 of the duct system 18 is coupled to the second outlet 26 of the exhaust transferring apparatus 16. When the bed 12 is positioned in its raised position as shown in FIG. 2, the input port 22 of the duct system 18 is decoupled from the outlet 26 of the exhaust transferring apparatus 16.

Figure 3:
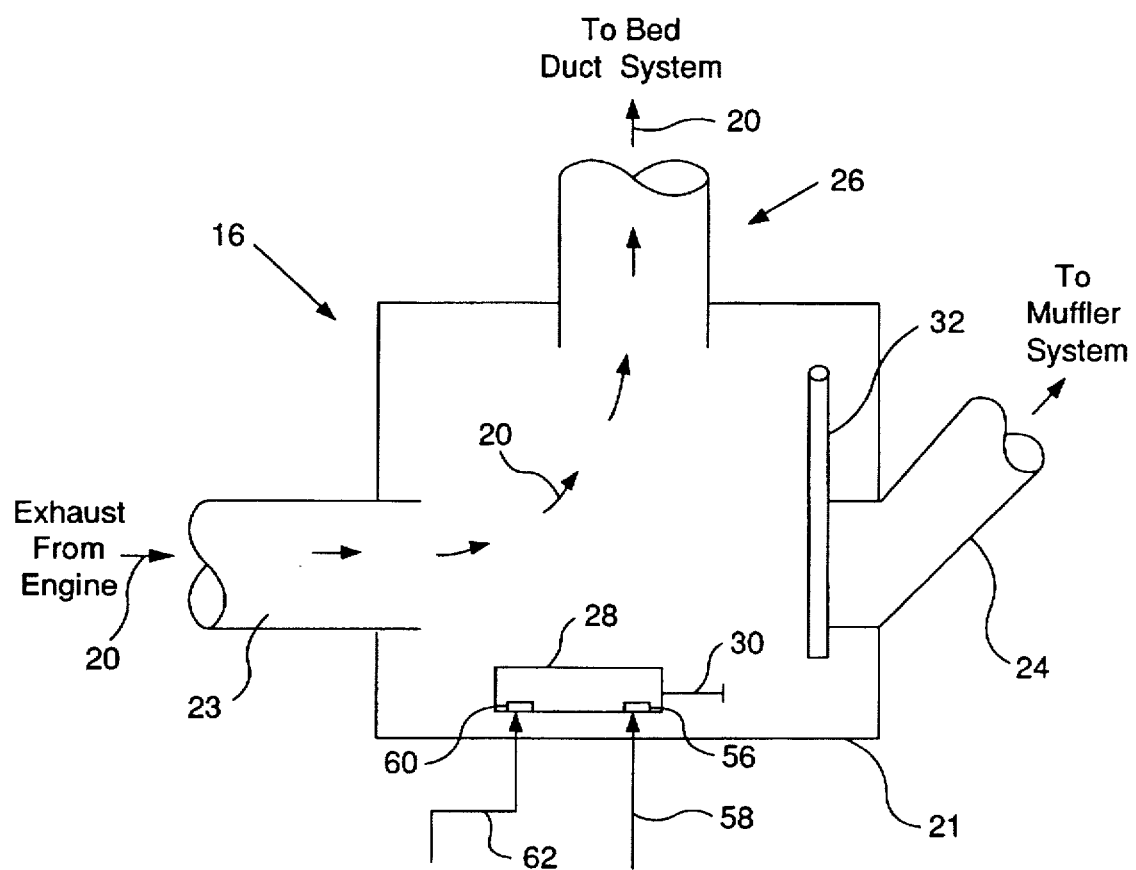
FIG. 3 is a schematic view of the exhaust diverter apparatus of FIG. 1, with the diverter member of the exhaust diverter apparatus shown positioned in a first position to prevent the flow of exhaust from being directed to the muffler system.
Figure 4:
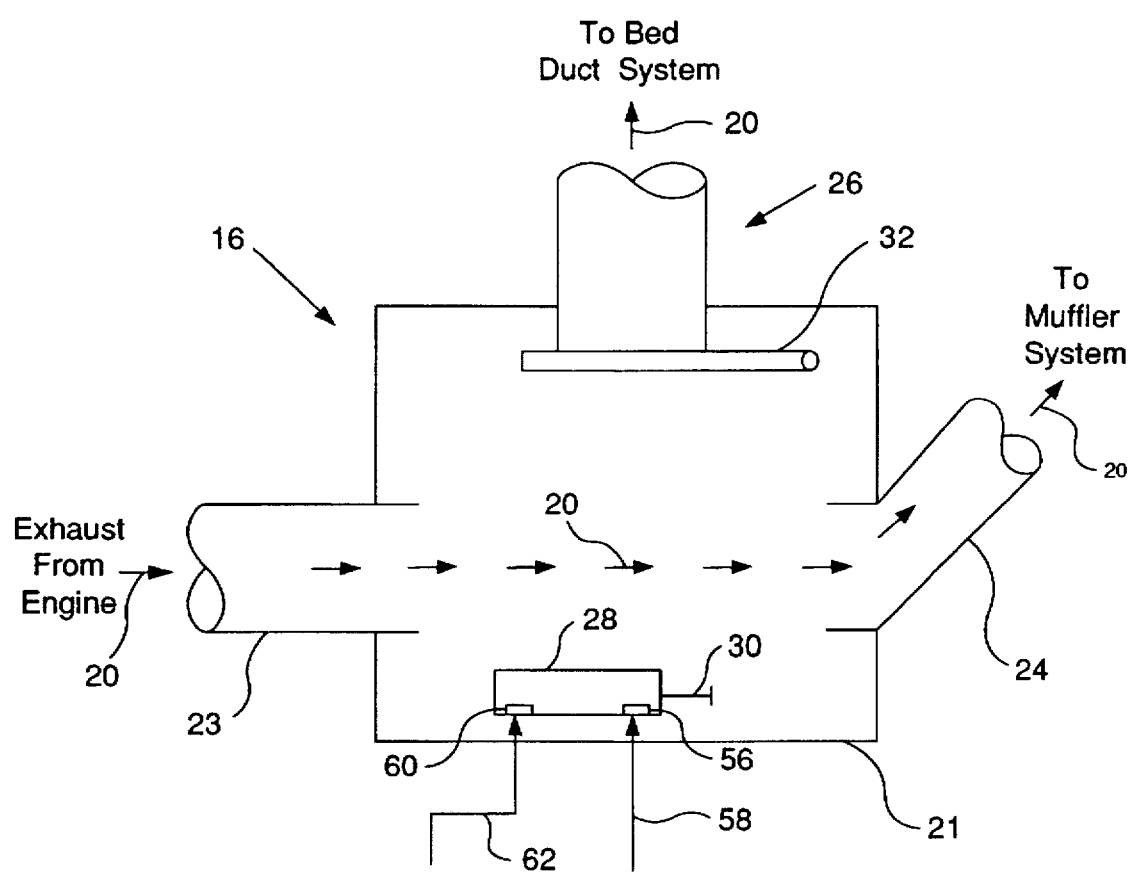
FIG. 4 is a view similar to FIG. 3, but showing the diverter member shown positioned in a second position to prevent the flow of exhaust from being directed to the bed duct system.

Referring now to FIGS. 3 and 4, the exhaust transferring apparatus 16 further includes an air cylinder 28 having a movable shaft 30. The movable shaft 30 is coupled to a diverter member 32 by a mechanical linkage (not shown). The diverter member 32 is positionable in a first position as shown in FIG. 3 and a second position as shown in FIG. 4. In the first position, the diverter member 32 is positioned so that the flow of exhaust 20 is prevented from being advanced to the muffler system 14. In the second position, the diverter member 32 is positioned so that the flow of exhaust 20 is prevented from being advanced to the duct system 18.

When the diverter member 32 is located in the first position as shown in FIG. 3, the flow of exhaust 20 is directed through the second outlet 26 and into the duct system 18 so as to heat the walls of the bed 12. When the diverter member 32 is located in the second position as shown in FIG. 4, the flow of exhaust 20 is directed through the first outlet 24 and into the muffler system 14 so as avoid creation of a high level of undesirable noise. Creation of a high level of undesirable noise is also prevented when the flow of exhaust 20 is directed through the bed duct system 18.

The second outlet 26 of the exhaust diverting apparatus 16 includes a lower outlet segment 36 and an upper outlet segment 38. A spring (not shown) is interposed between the lower outlet segment 36 and the upper outlet segment 38 so as to allow relative movement therebetween. This feature functions to dampen the impact of the bed 12 as it is lowered onto the upper outlet segment 38 after ejecting material from the bed.

Referring again to FIGS. 1 and 2, the exhaust diverting apparatus 16 further includes an air solenoid 40, a sensor 42, an inversion valve 44, a T-shaped connector 46 and an air source 48. The air source 48 provides 120 psi of air pressure via air hoses 50 to the air solenoid 40 and to the inversion valve 44. The air solenoid 40 is connected to the T-shaped connector 46 via an air hose 52. The T-shaped connector 46 is connected to the inversion valve 44 via an air hose 54. The T-shaped connector 46 is further connected to a first input port 56 of the air cylinder 28 (see FIG. 3) via an air hose 58, while the inversion valve 44 is connected a second input port 60 of the air cylinder (see FIG. 3) via an air hose 62.

Figure 5:
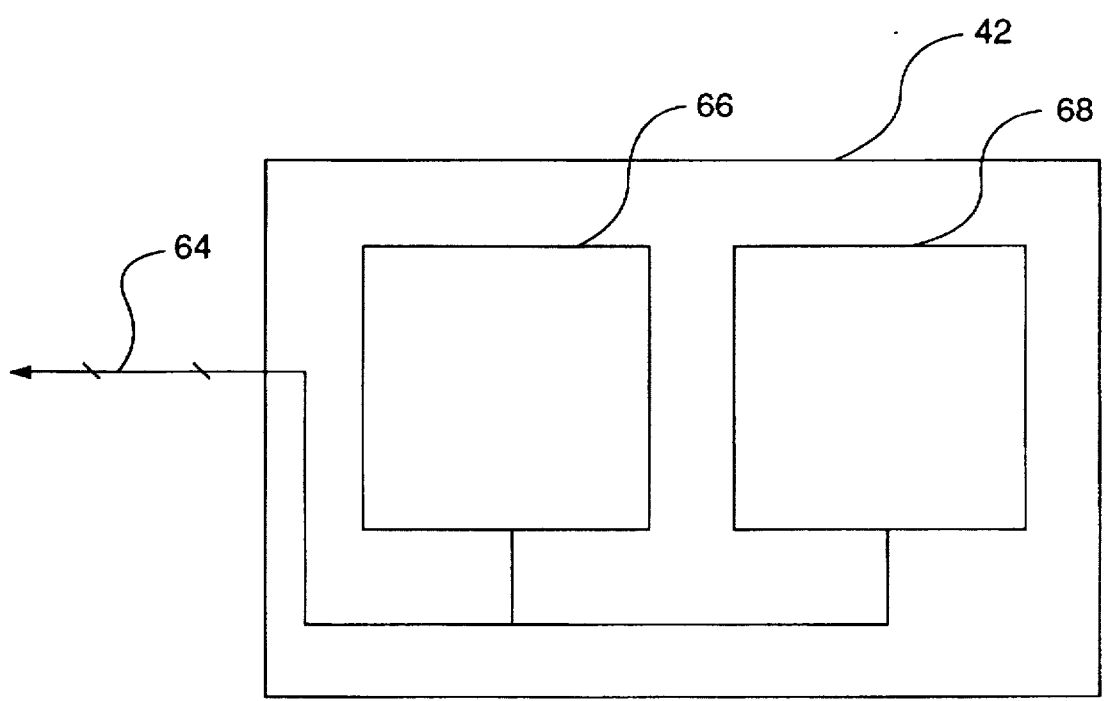
FIG. 5 is schematic view of the sensor of the diverter apparatus of FIG. 1.

The sensor 42 is connected to the air solenoid 40 via a signal line 64. As shown in FIG. 5, the sensor 42 includes a first sensor mechanism 66 and a second sensor mechanism 68. The first sensor mechanism 66 detects when a hoist control switch (not shown) is being actuated by an operator of the truck 10 in order to raise the bed 12, and generates an electrical signal on the line 64 in response thereto. The second sensor mechanism 68 is a hall effect sensor positioned in relation to the bed 12 so as to detect when the bed 12 is being raised upwardly from its lowered position, and generates an electrical signal on line 64 in response thereto.

FIG. 6 is a chart which indicates various status relationships between the first sensor mechanism 66, the second sensor mechanism 68, the signal line 64 and the air solenoid 40. When either the first sensor mechanism 66 and the second sensor mechanism 68 is generating an electrical signal, sensor 42 generates a signal on the line 64.

When no signal is being generated on line 64, the solenoid 40 is unpowered and does not pass a flow of air from the air supply 48 to the T-connector 46. When the flow of air is not being passed to the T-connector 46, no air signal is being provided to the inversion valve 44 via air hose 54. Without this air signal, the inversion valve is free to pass the flow of air from the air supply 48 to the second input port 60 of the air cylinder 28. In turn, the shaft 30 of the air cylinder 28 is caused to assume its extended position as shown in FIG. 3. Accordingly, the diverter member 32 is caused to be placed in the first position thereby preventing the flow of exhaust 40 from being advanced to the muffler system 14.

When a signal is being generated on line 64 by the sensor 42, the solenoid 40 is powered and does pass the flow of air from the air supply 48 to the T-connector 46. When the flow of air is being passed to the T-connector 46, an air signal is provided to the inversion valve 44 via air hose 54. This air signal causes the inversion valve to prevent the flow of air from being passed from the air supply 48 to the second input port 60 of the air cylinder 28. Also when the flow of air is being passed to the T-connector 46, the flow of air is passed to the first input port 56 of the air cylinder 28. In turn, the shaft 30 of the air cylinder 28 is caused to assume its withdrawn position as shown in FIG. 4. As a result, the diverter member 32 is caused to be placed in the second position thereby preventing the flow of exhaust 40 from being advanced to the duct system 18.

Since the diverter member 32 is caused to assume the second position thereby diverting the flow of exhaust 20 to the muffler system 14 when the first sensor mechanism detects actuation of the hoist control switch by the operator of the truck, the flow of exhaust 20 is diverted to the muffler system 14 prior to any decoupling or separation between the input port 22 of the duct system 18 and the second outlet 26 of the exhaust diverting apparatus 16. Thus, no momentary occurrence of a high level of undesirable noise occurs when the bed 12 is moved from its lowered position to its raised position.

Also, since the diverter member 32 is moved between its first position and its second position by the air cylinder 28, the working parts of the exhaust diverting apparatus 16 will not wear out relatively quickly.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

I claim:

1. An apparatus for diverting a flow of exhaust from an engine of a truck having a truck bed and a muffler system, with the truck bed having a duct system, comprising:

a diverter member positionable between a first position and a second position, wherein (1) the flow of exhaust is prevented from being advanced into the muffler system and allowed to be advanced into the duct system when said diverter member is positioned in the first position, and (2) the flow of exhaust is prevented from being advanced into the duct system and allowed to be advanced into the muffler system when said diverter member is positioned in the second position;

a sensor which detects raising of the truck bed and generates an electrical signal in response to raising of said truck bed; and an actuator for moving the diverter member between the first position and the second position in response to said electrical signal.

2. The apparatus of claim 1, wherein said sensor includes:

a first sensor mechanism which detects when a hoist control switch is being actuated to raise the truck bed; and a second sensor mechanism which detects when the truck bed is not positioned in a lowered position.

3. The apparatus of claim 2, wherein said sensor generates the electrical signal when the first sensor mechanism detects actuation of the hoist control switch, and when the second sensor mechanism detects the truck bed is not positioned in the lowered position.

4. The apparatus of claim 3, wherein said actuator includes an air cylinder, and further comprising:

an air supply which provides a flow of air to said air cylinder.

5. The apparatus of claim 4, wherein:

said air cylinder includes a movable shaft, and said movable shaft is mechanically coupled to said diverter member.

6. The apparatus of claim 4, wherein:

the flow of air is passed to said air cylinder through a first air flow pathway and a second air flow pathway, said air cylinder includes a first input port and a second input port, the first input port is coupled to the first air flow pathway, the second input port is coupled to the second air flow pathway, and air flow in said first pathway maintains said diverter member in said first position, air flow in said second air flow pathway maintains said diverter member in said second position.

7. The apparatus of claim 6, further comprising:

a solenoid interposed between said air supply and the first input port of said air cylinder, said solenoid (1) allows the first air flow pathway to be coupled to the first input port of said air cylinder when the electrical signal is being generated; and (2) prevents the first air flow pathway from being coupled to the first input port of said air cylinder when no electrical signal is being generated; and an air valve interposed between said air supply and the second input port of said air cylinder, said air valve (1) allows the second air flow pathway to be coupled to the second input port of said air cylinder when no electrical signal is being generated, and (2) prevents the second air flow pathway from being coupled to the second input port of said air cylinder when the electrical signal is being generated.

8. The apparatus of claim 7, wherein:

said solenoid provides a solenoid control signal to said air valve when said solenoid is allowing the first air flow pathway to be coupled to the first input port of said air cylinder, and said air valve prevents the second air flow pathway from being coupled to the second input port of said air cylinder in response to receipt of the solenoid control signal.

9. An apparatus for diverting a flow of exhaust from an engine of a truck having a truck bed and a muffler system, with the truck bed having a duct system, comprising:

an inlet for receiving the flow of exhaust from the engine;

a first outlet connected to the duct system;

a second outlet connected to the duct system;

a diverter member positionable between a first position and a second position, wherein (1) fluid communication between said inlet and said first outlet is prevented when said diverter member is positioned in the first position, and (2) fluid communication between said inlet and said second outlet is prevented when said diverter member is positioned in the second position;

a sensor which detects decoupling of said second outlet from the duct system and generates an electrical signal in response thereto; and an air cylinder for moving said diverter member, said air cylinder moving said diverter member between the first position and the second position in response to the electrical signal.

10. The apparatus of claim 9, wherein:

fluid communication between said inlet and said second outlet is allowed when said diverter member is positioned in the first position, and fluid communication between said inlet and said first outlet is allowed when said diverter member is positioned in the second position.

11. The apparatus of claim 9, wherein:

said air cylinder includes a movable shaft, and said movable shaft is mechanically coupled to said diverter member.

12. The apparatus of claim 10, wherein said sensor includes:

a first sensor mechanism which detects when a hoist control switch is being actuated to raise the truck bed; and a second sensor mechanism which detects when the truck bed is not positioned in the lowered position.

13. The apparatus of claim 12, wherein said sensor generates the electrical signal when (1) the first sensor mechanism detects actuation of the hoist control switch, or (2) the second sensor mechanism detects when the truck bed is not positioned in the lowered position.

14. The apparatus of claim 9, further including an air supply which provides a flow of air to said air cylinder, the flow of air being passed to said air cylinder through a first air flow pathway and a second air flow pathway, and wherein, said air cylinder includes a first input port and a second input port, the first input port is coupled to the first air flow pathway, and the second input port is coupled to the second air flow pathway.

15. The apparatus of claim 14, further comprising:

a solenoid interposed between said air supply and the first input port of said air cylinder, said solenoid (1) allows the first air flow pathway to be coupled to the first input port of said air cylinder when the electrical signal is being generated; and (2) prevents the first air flow pathway from being coupled to the first input port of said air cylinder when the electrical signal is not being generated by the sensor; and an air valve interposed between said air supply and the second input port of said air cylinder, said air valve (1) allows the second air flow pathway to be coupled to the second input port of said air cylinder when the electrical signal is not being generated by said sensor, and (2) prevents the second air flow pathway from being coupled to the second input port of said air cylinder when the electrical signal is being generated.

16. The apparatus of claim 15, wherein:

said solenoid provides a solenoid control signal to said air valve when said solenoid is allowing the first air flow pathway to be coupled to the first input port of said air cylinder, and said air valve prevents the second air flow pathway from being coupled to the second input port of said air cylinder in response to receipt of the solenoid control signal.

* * * * *